(12) United States Patent
Johannsen

(10) Patent No.: US 10,882,574 B2
(45) Date of Patent: Jan. 5, 2021

(54) METHOD OF TRACK LINK MANUFACTURE

(71) Applicant: Caterpillar Inc., Peoria, IL (US)

(72) Inventor: Eric James Johannsen, Metamora, IL (US)

(73) Assignee: Caterpillar Inc., Peoria, IL (US)

(*) Notice: Subject to any disclaimer, the term of this patent is extended or adjusted under 35 U.S.C. 154(b) by 587 days.

(21) Appl. No.: 15/220,055

(22) Filed: Jul. 26, 2016

(65) Prior Publication Data
US 2018/0029653 A1 Feb. 1, 2018

(51) Int. Cl.
*B62D 55/21* (2006.01)
*B62D 55/20* (2006.01)
*B21K 23/02* (2006.01)
*B23K 20/12* (2006.01)

(52) U.S. Cl.
CPC ........... *B62D 55/20* (2013.01); *B21K 23/02* (2013.01); *B23K 20/1205* (2013.01); *B62D 55/21* (2013.01); *B62D 55/211* (2013.01); *B62D 55/213* (2013.01)

(58) Field of Classification Search
CPC ...... B62D 55/211; B62D 55/21; B62D 55/20; B62D 55/213; B23K 20/1205; B23K 20/129; B23K 20/12; B21K 23/02
USPC ............... 228/112.1; 305/198, 201
See application file for complete search history.

(56) References Cited

U.S. PATENT DOCUMENTS

| | | | |
|---|---|---|---|
| 2,982,585 A | 5/1961 | Scott, Jr. | |
| 3,237,999 A * | 3/1966 | Pentecost | B62D 55/20 29/463 |
| 3,795,431 A * | 3/1974 | Boggs | B62D 55/12 305/198 |
| 3,947,074 A * | 3/1976 | Nelson | B62D 55/28 305/190 |
| 4,159,857 A * | 7/1979 | Purcell | B62D 55/28 305/187 |
| 4,428,625 A * | 1/1984 | Wohlford | B62D 55/28 305/108 |
| 5,482,361 A | 1/1996 | Burckhardt et al. | |
| 5,749,635 A * | 5/1998 | Umbarger | B62D 55/20 305/187 |
| 8,323,427 B1 * | 12/2012 | Slattery | C22C 21/00 148/522 |
| 8,905,493 B2 * | 12/2014 | Liu | B62D 55/21 305/185 |
| 9,045,180 B2 | 6/2015 | Brewer et al. | |
| 9,290,217 B2 | 3/2016 | Steiner et al. | |
| 2005/0263569 A1 * | 12/2005 | Miller | B23K 20/1285 228/112.1 |
| 2008/0308611 A1 * | 12/2008 | Alessi | B23K 20/1205 228/112.1 |
| 2010/0270359 A1 * | 10/2010 | Young | B23K 20/121 228/102 |
| 2012/0286567 A1 * | 11/2012 | Liu | B62D 55/21 305/185 |
| 2013/0139968 A1 * | 6/2013 | Johnson | B23K 20/1205 156/350 |

(Continued)

*Primary Examiner* — Scott A Browne
(74) *Attorney, Agent, or Firm* — Law Office of Kurt J. Fugman LLC

(57) ABSTRACT

A method of fabricating a track link comprises creating a rail portion of a track link from a high alloy steel, creating a main body portion of a track link from a low alloy steel, and friction adhering the rail portion onto the main body portion.

19 Claims, 6 Drawing Sheets

(56) References Cited

U.S. PATENT DOCUMENTS

| | | | |
|---|---|---|---|
| 2014/0001825 A1* | 1/2014 | Hakes | B62D 55/14 |
| | | | 305/136 |
| 2014/0283960 A1* | 9/2014 | Liu | C22C 38/38 |
| | | | 148/575 |
| 2014/0369741 A1* | 12/2014 | Cui | B23K 20/1205 |
| | | | 403/271 |
| 2015/0008730 A1* | 1/2015 | Steiner | C21D 1/10 |
| | | | 305/202 |
| 2015/0210328 A1 | 7/2015 | Hall | |
| 2015/0361534 A1* | 12/2015 | Amada | B62D 55/21 |
| | | | 305/201 |

* cited by examiner

METHOD OF TRACK LINK MANUFACTURE

TECHNICAL FIELD

The present disclosure relates to a track link that is used as a part of a track chain assembly attached to the undercarriage of track-type vehicles used for off-road operations such as those that use endless tracks for moving on the ground. Specifically, the present disclosure relates to a track link that has a rail portion and a main body portion that are made from different materials.

BACKGROUND

In many current applications, a track link is forged from one piece of high alloy steel. After forging, the entire link is typically subjected to a direct harden process. This raises the hardness of the link to RCW C33-37. Then, just the wear surface of the rail of the track link, which is the part of the track link that contacts the rollers, is induction hardened to RCW C50-55. Using high alloy steel is expensive. Also, a transition zone is created between the softer and harder materials. This transition zone may be characterized as being a "tempered back" or "heat affected zone", which may be undesirable as this may cause brittleness of the material.

Track links that are made of a separate rail portion and main body portion are known in the art. For example, U.S. Pat. No. 3,795,431 to Boggs et al. discloses a track link that has a rail portion that is welded or bolted to the main body portion of the track link. However, these embodiments are not satisfactory as the differential of rail longitudinal growth as compared to the longitudinal growth of the main body portion, which occurs as the track link is loaded during use, causes separation or damage to the connecting features between the rail portion and main body portion of the links. This problem is exacerbated if the rail and main body portions are made from different materials as this naturally increases the difference in the growth rates along the longitudinal direction of the track link. Furthermore, the differing carbon content of high versus low alloy steels would not allow them to be welded together effectively.

SUMMARY

A track link is provided for use with a track chain of a vehicle that includes a plurality of track pins and bushings. The track link comprises a main body portion that defines a plurality of apertures for receiving a track pin or bushing, the main body portion comprising a low alloy steel, and a rail portion that that comprises a high alloy steel.

A track chain assembly for use with a vehicle that includes an endless track drive is provided. The track chain comprises a plurality of track pins and track bushings disposed about the track pins, and a plurality of track links that are connected to each other by either a track pin or a track bushing, wherein at least one track link comprises a main body portion that defines a plurality of apertures for receiving a track pin or bushing, the main body portion comprising a low alloy steel, and a rail portion that that comprises a high alloy steel.

A method of fabricating a track link is provided. The method comprises creating a rail portion of a track link from a high alloy steel, creating a main body portion of a track link from a low alloy steel, and friction adhering the rail portion onto the main body portion.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
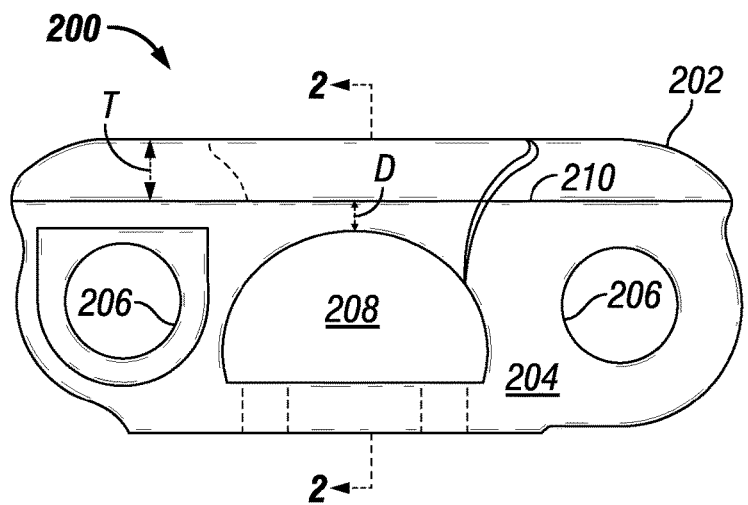
FIG. 1 is a front view of a straight track link that includes a rail portion and a main body portion that are attached to each other using linear friction welding according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

An alloy steel is a steel that is alloyed with a variety of elements. In total, these amounts vary between 1.0% and 50% by weight to improve its mechanical or physical properties. Alloy steels are broken down into two groups: low-alloy steels and high-alloy steels. The difference between the two is somewhat arbitrary: some references define a high alloy steel as having 8% or more of alloying elements (elements other than carbon or iron) while other define the threshold as 4%. As used herein, a high alloy steel is one that has more than 6% by weight of alloy elements while a low alloy steel is one that has less than 6% of alloy elements.

Figure 2:
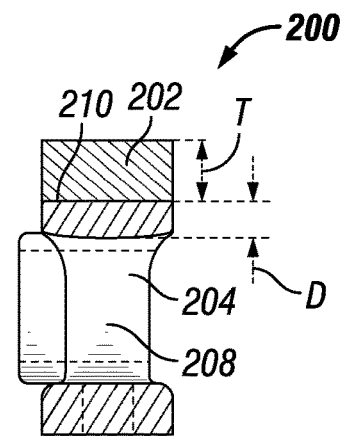
FIG. 2 is a side cross-sectional view of the track link of FIG. 1 taken along lines 2-2 thereof.
Figure 3:
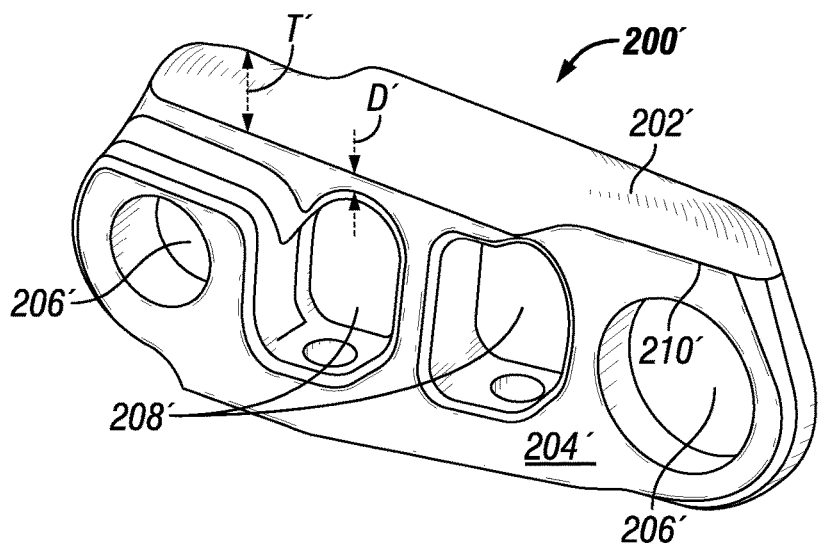
FIG. 3 is a perspective view of an offset track link that includes a top rail portion comprising a high alloy steel and a main body portion comprising a low alloy steel according to another embodiment of the present disclosure.

FIGS. 1 thru 3 illustrate various embodiments of a track link according to the present disclosure. FIGS. 1 and 2 are directed to a straight track link 200, so called, as its cross-sectional area does not vary from one end to the other. FIG. 3 is directed to an offset link 200' where the cross-section jogs from one end to the other. It is to be understood that the configuration of the track link for any embodiment discussed herein may be varied as needed or desired. Any embodiment of the track link described herein may be used as part of a track chain assembly of a vehicle that includes a plurality of track pins and bushings. This will be described in further detail later herein.

As shown in FIGS. 1-3, the track link 200, 200' may comprise a main body portion 204, 204' that defines a plurality of apertures 206, 206' for receiving a track pin or bushing (not shown), the main body portion 204, 204' comprising a low alloy steel and a rail portion 202, 202' that that comprises a high alloy steel. Additional bores 208, 208' may be provided to allow access to bolts that are used to attach shoes or other components (not shown) to the track link. The rail portion 202, 202' may be attached to the main body portion 204, 204' using linear friction welding. This avoids the problem associated with traditional welding that is caused by the different carbon contents of the steel alloys.

In some embodiments, the hardness of the rail portion 202, 202' of the track link is RCW C50-55 while the hardness of the main body portion 204, 204' is RCW C33-37. It is contemplated that in other embodiments that the main body portion of the track link may remain unhardened.

As shown in FIGS. 1-3, the rail portion 202, 202' defines a consistent rail thickness T, T' (minimum dimension). As a result, the interface 210, 210' between the rail portion 202, 202' and the main body portion 204, 204' is flat or linear. It is contemplated that the thickness and the interface may vary in other embodiments such as when an undulating or scalloped profile is used. The rail thickness T, T' may range 4-20 mm.

In many embodiments, a minimum distance D from the rail portion 202 to any aperture 206, 208 of the main body 204 portion is maintained to avoid compromising the structural integrity of the link 200, 200'. This distance may be about 4-8 mm in some embodiments.

Examples of materials used for the rail portion include 15B34, 35MnB, etc. Similarly, examples of materials used for the main body portion include 15B27, 25MnB or lesser grade. The grades of materials may be varied as needed or desired as well as the various dimensions discussed herein.

INDUSTRIAL APPLICABILITY

In practice, a track link may be newly made using two different alloy steels as described herein or an existing track link may be refurbished or remanufactured using the method of manufacturing a track link as will be described momentarily. When remanufacturing, the rail portion may be machined away and a rail portion may then be attached to the remaining main body portion. Also, one or more track links as described herein may be used as part of a track chain assembly that may be sold and implemented onto an undercarriage drive system, etc. In some cases, the machine may be sold with the track chain assembly using any of the track links described herein.

Figure 4:
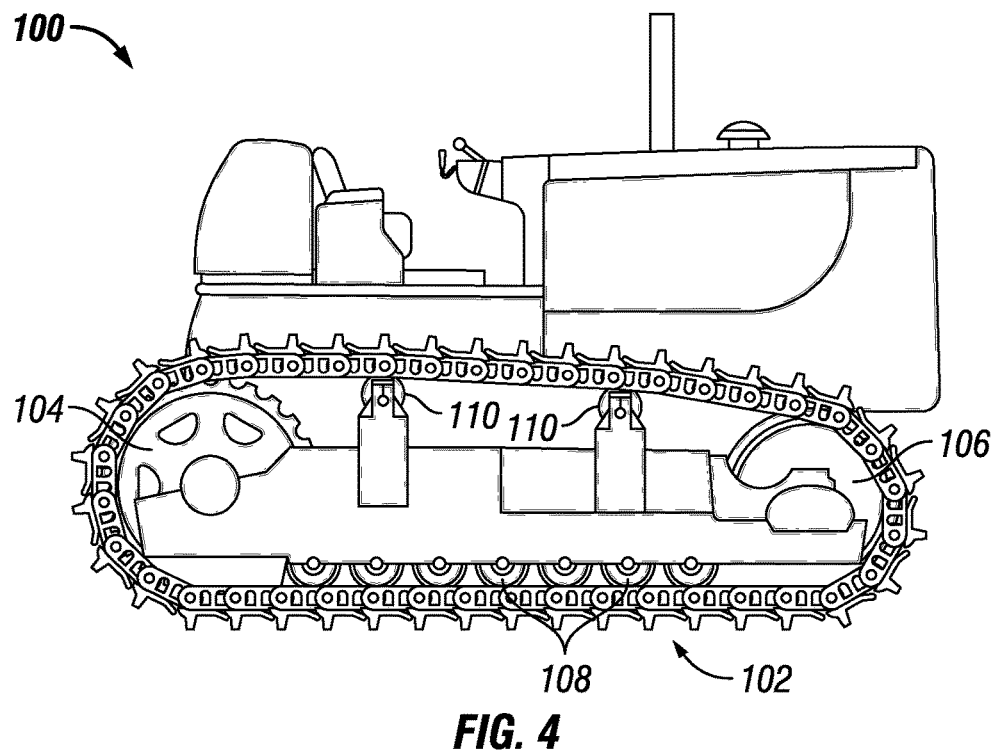
FIG. 4 is a front view of a tractor that uses an endless track for mobility that uses a track chain that may use various embodiments of a track link as disclosed herein.

FIG. 4 illustrates a track-type tractor 100 employing a pair of endless track chain assemblies 102 (one shown) of this invention thereon. Although the track assembly is particularly adapted for use on a tractor, it should be understood that the track assembly will find application to other vehicles, such as track-type excavators or any other type of off-road vehicle or machinery. In the tractor application illustrated in FIG. 1, each track chain assembly 102 is mounted in a conventional manner on a drive sprocket 104, an idler 106, a plurality of longitudinally spaced track rollers 108, and a pair of upper guide or carrier rollers 110, when needed.

Figure 5:
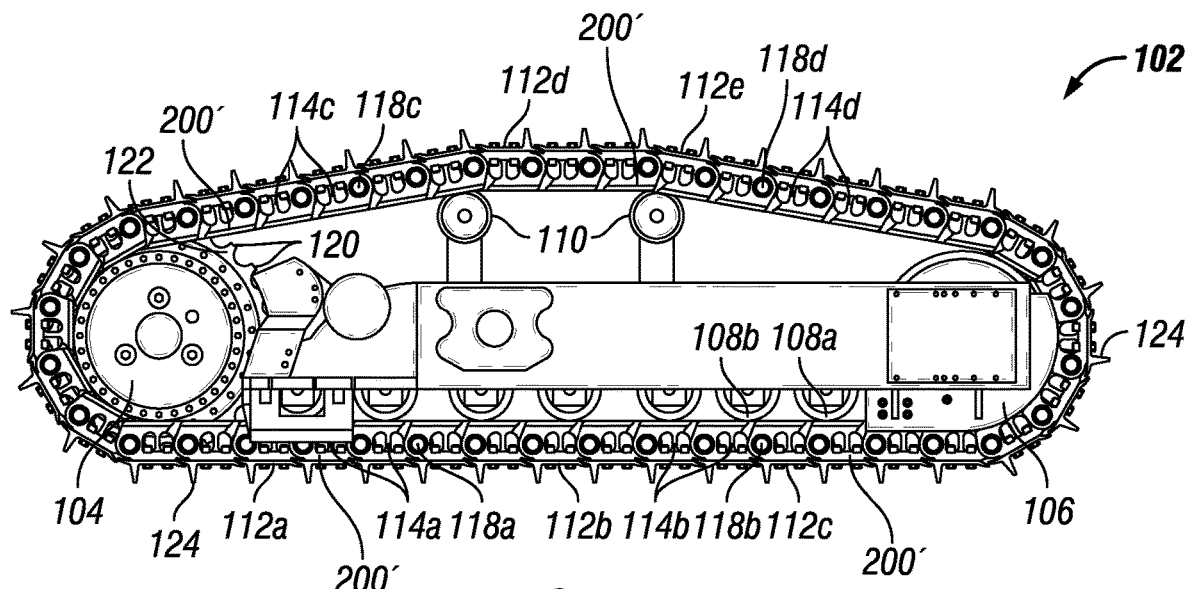
FIG. 5 is a front view of an endless track that is similar to that disclosed in FIG. 4 but is isolated from the tractor, illustrating more clearly an in-line configuration of endless track.
Figure 6:
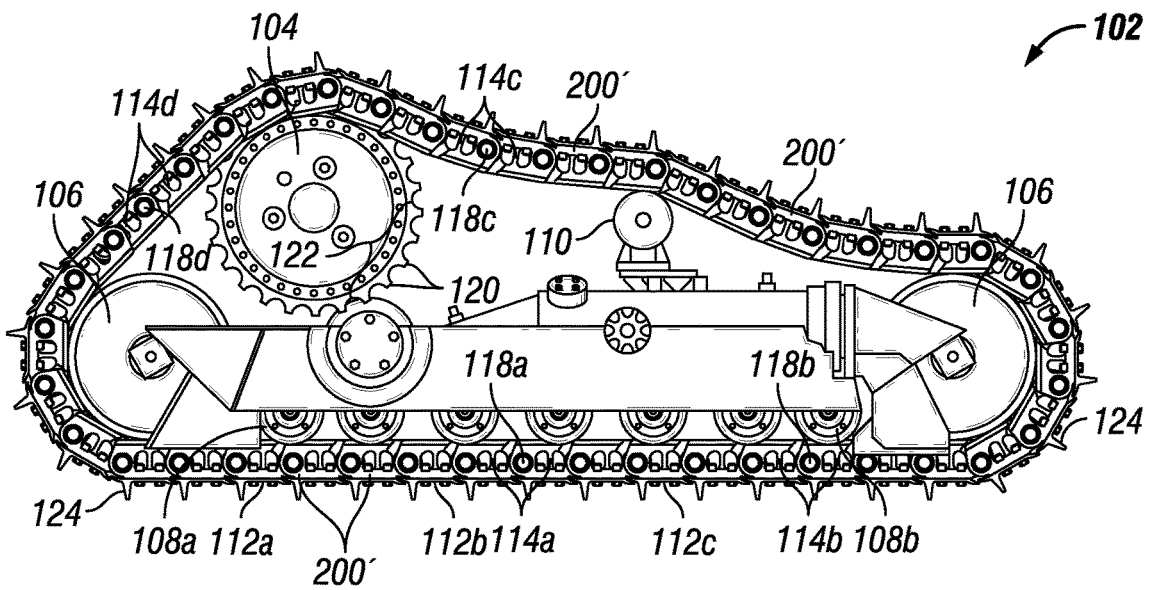
FIG. 6 is a front view of an endless track similar to that shown in FIG. 5 except that is uses an elevated drive sprocket.

Referring to FIGS. 5 and 6, a track assembly 102 comprises a plurality of track shoes 112 which are pivotally interconnected by an articulated link assembly 114. Link assembly 114 is disposed intermediate the widths of track shoes 112 and includes a plurality of pairs of links 200, 200', pivotally interconnected together by standard pin and bushing assemblies 118. The teeth 120 of drive sprocket 104 engage the bushings of pin and bushing assemblies 118 to drive track assembly 102 in a conventional manner with the track assemblies being guided by idler 106 and rollers 108 and 110 which engage upper rail portions of links 200, 200'. The main difference between the configurations of the track assembly of FIGS. 5 and 6 is that FIG. 5 is an inline configuration, so called as the drive sprocket is in-line with the front idler wheel forming a substantially ovular path for the track, while FIG. 6 shows an elevated configuration, so called as the drive sprocket is vertically above the lower idler wheels forming a substantially triangular path for the track.

With continued reference to FIGS. 5 and 6, the lower rollers are often called track rollers 108 as they support the weight of the vehicle and transfer it to the track and then to the ground while the upper rollers are often called carrier rollers 110 as they only carry or support the track, limiting or sometimes modifying the catenary hang of the track. The drive sprockets 104 have segments 122 with drive teeth 122 connected to them or integrally formed therewith that mesh with the links 200, 200' in the track chain assembly 102, powering movement of the track, and thus the vehicle. The shoes 112 include provide movable platforms that engage the ground and include ribs or grousers 124 that penetrate the ground, providing traction. The idler wheels 106 lack teeth but ride between the links 200, 200' (see G in FIG. 5) and on top of the rails (see 202, 202' of FIGS. 7 and 8) of the links 200, 200', limiting side to side movement of the track. Similarly, the rollers 108, 110 provide a conduit for the transfer of weight, and in many cases, provide a way to adjust the tension in the track. The rollers 108, 110 also ride between the links 116 and on top of the rails 202, 202' of the links 200, 200', limiting side to side movement of the track.

Figure 7:
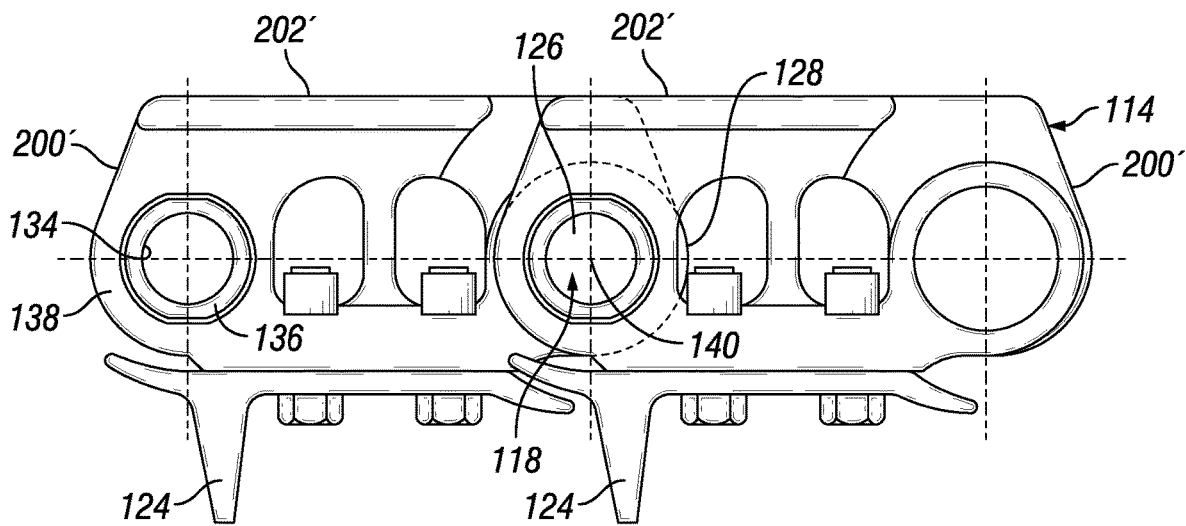
FIG. 7 is an enlarged front view of a pair of track links that are joined together by a track pin and bushing in a manner that is similar to the tracks illustrated in FIGS. 5 and 6.
Figure 8:
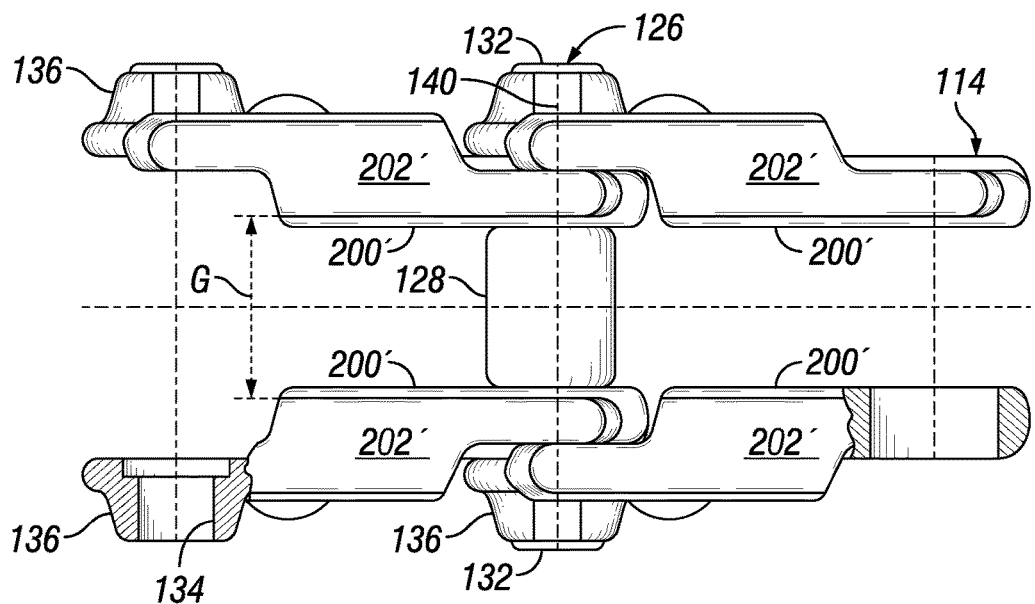
FIG. 8 is a top view of the track links, bushing and track pin of FIG. 7. The track shoes are removed for extra clarity.

Turning now to FIGS. 7 and 8, they show an example of a link assembly 114 that includes a pair of track links 200, 200' that are joined together by a track pin and bushing assembly 118 in a manner consistent with the tracks illustrated in FIGS. 4 and 5. The track pin and bushing assembly 118 form a joint that includes a cylindrical pin 126, and a rotatable tubular bushing 128. The pin 126 has opposite end portions 132 (best seen in FIG. 8), each of which is pressed and non-rotatably mounted into a respective one of the bore 134 formed by a protruding boss 136 of the outboard end collars 138 of each link 116 in a link set 114. The pin and bushing assembly 118 further includes a method and device for mechanically interlocking the pin 126 within such bores 134 to prevent any axial movement of the links 116 along a longitudinal or cylindrical axis 140 of the pin 126.

Other types of methods for mechanically interlocking the pin to the links that are known or that will be devised in the art may be employed. One mechanically interlocking method comprises a circumferentially disposed, generally arcuately shaped groove formed about each of the end portions of the pin and at least one mechanically formed nodule which protrudes radially inwardly from each of the bores into a respective one of the grooves. The mechanically formed nodules are preferably formed by using a punch device. Preferably, a pair of such punch devices are located perpendicular to the pin axis on each of the flats provided on the pin boss. The application of a sufficient force of the punch devices will result in the extrusion of the boss metal into the groove. Other methods for achieving this are also available and may be used.

Figure 9:
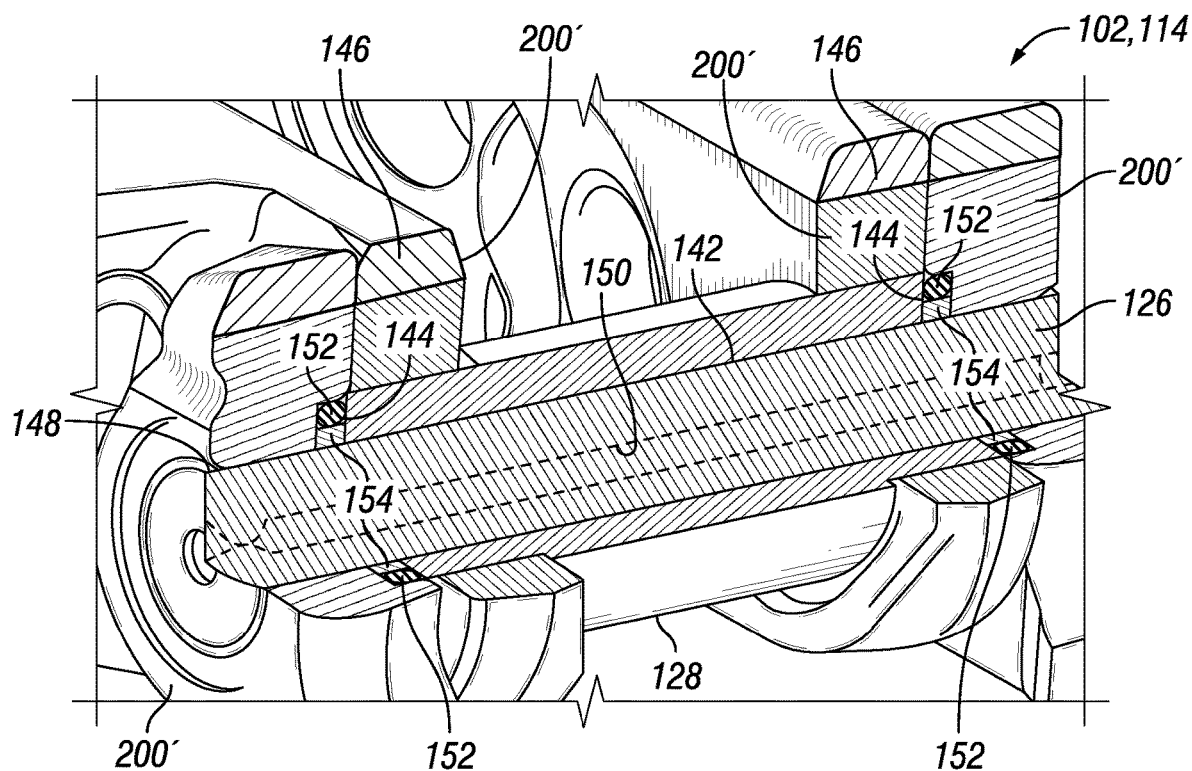
FIG. 9 is a perspective sectional view of track links, a bushing and track pin that is similar to that shown in FIG. 8.

Referring to FIG. 9, there is shown a portion of an undercarriage for a track-type machine that uses a track chain assembly 102 and link assembly 114 that are similar to those described thus far herein. The tubular bushing 128 is provided with a pin bore 142 which is of a size sufficient to freely rotatably mount the bushing 128 about the pin 126. Bushing 128 has a pair of opposite end faces 144 and is of a size to extend between and to freely rotatable relative to the inboard end collars 146.

As shown in FIG. 9, each link assembly includes inboard links 200, 200' and outboard links 200, 200'. Inboard links 200, 200' and outboard links 200, 200' may be coupled together with a plurality of additional inboard and outboard links (not shown), to form an endless chain extending about a conventional drive mechanism including one or more track idlers and a drive sprocket. This may be used in a variety of track-type machines, such as a track-type tractor, tracked excavator, tracked loader, or the like. As will be further apparent from the following description, one practical implementation of the teachings set forth herein is contemplated to be in track-type tractors used in particularly harsh field conditions, such as mines and landfills.

The track pin 126 may be press fit with outboard links 200, 200'. In one embodiment, retention rings 148 or some other mechanism for positive pin retention may be coupled with pin 126 to enhance the strength of the coupling with outboard links 200, 200'. In the embodiment shown, inboard links 200, 200' and outboard links 200, 200' include S-shaped or offset links, however the present disclosure is not limited in this regard and straight link track might also be used. During operation as already discussed, one or more track idlers and a drive sprocket may engage with the bushing 128 to guide and provide power to the track in a conventional manner. As will be familiar to those skilled in the art, some structure for lubricating surfaces which move against one another within the track assembly may be desirable. To this end, the pin 126 may include an oil passage 150 which serves as an oil reservoir for supplying oil to desired locations within track segment.

During track assembly at the factory or during track repair or servicing, lubricating oil may be supplied into passage 150, and the oil passage may be plugged to seal the lubricating oil therein. A set of seals 152 may also be provided, which fluidly seal between outboard links 200, 200' and bushing 128 to retain oil within the link assembly 114. The link assembly 114 also includes a set of thrust rings 154, each positioned between the bushing 128 and one of outboard links 116'. Thrust rings 154 can react to thrust loads through the link assembly 114, and may be configured to prevent compressive forces on seals 152 which can otherwise impart a tendency for seals to fail. Each of thrust rings 154 may be uniquely configured to provide a robust mechanism for reacting thrust loads, but also facilitate the transfer into and maintaining of oil within a region of the link assembly 114 defined between bushing 128 and outboard links 200, 200', and also between each seal 152 and the pin 126. It should be noted that the oil passage is shown in dotted lines, indicating that in certain embodiments, it may not be present, such as will now be described.

Figure 10:
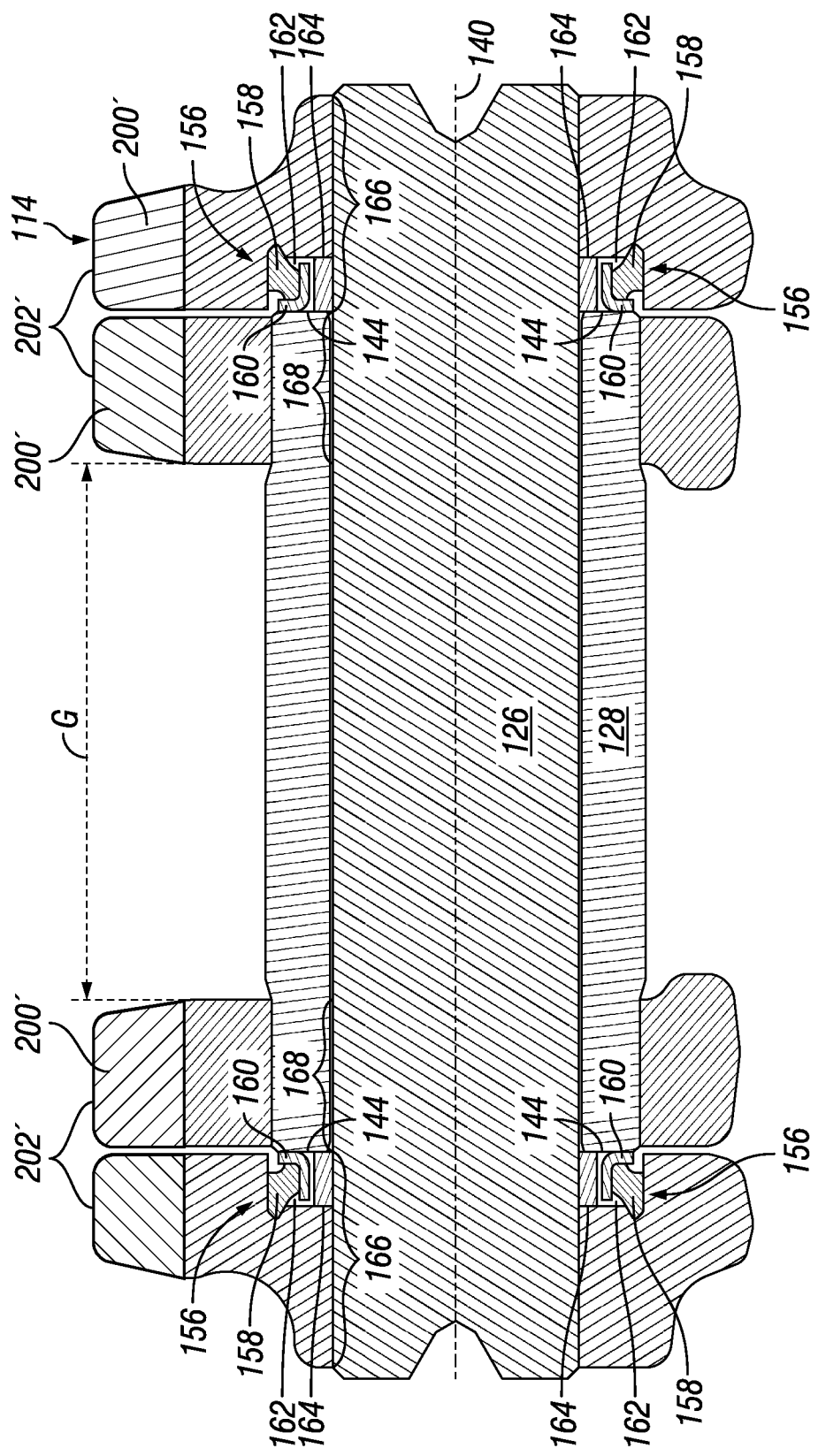
FIG. 10 is a plan sectional view of track links, bushing and track pin similar to that shown in FIG. 8, where the track pin is of solid construction, lacking a central oil groove that runs along its cylindrical axis.

FIG. 10 shows another track link assembly 114 that is known in the art that lacks an oil passage or other void that surrounds the longitudinal axis of the pin. This link assembly 114 includes a seal assembly 156 that includes first and second seal members 158, 160 that provide sealing between the inboard end collars 146 of the outboard link 200, 200' and the bushing 128. Each of the seal assembly 156 is disposed within each of the counterbores 162 between the shoulder 164 of the counterbore and the adjacent outer end face 144 of the bushing 128 and in sealing engagement against the outer end face 144. These type of seals are often referred to as rotating face seals as they allow the bushing to rotate relative to the pin 126 and outboard link while still keeping lubrication from leaking. Also, thrust rings are provided between the pin and seal assembly for reasons already explained above. The pin includes regions that absorb loads from the links either directly or indirectly through the bushing. Specifically, region 166 is in contact with the outboard link 116' while region 168 is in contact with the bushing 128 directly underneath the inboard link 200, 200'.

Figure 11:
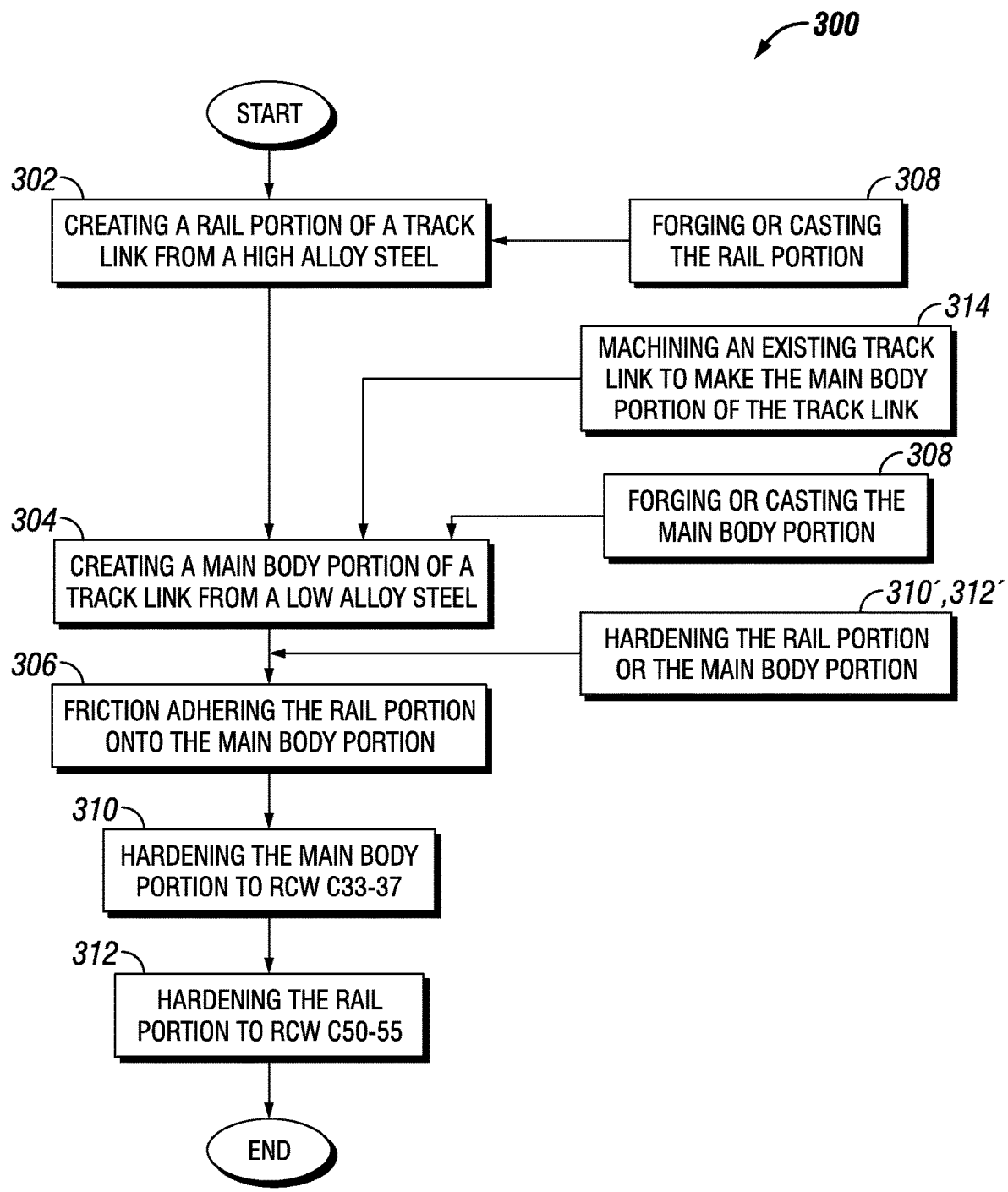
FIG. 11 is a flow chart depicting a method of creating a track link having a rail portion and a main body portion with different properties.

A method 300 of for manufacturing a track link according the embodiments of the present disclosure is illustrated by FIG. 11. The method 300 comprises creating a rail portion of a track link from a high alloy steel (step 302), creating a main body portion of a track link from a low alloy steel (step 304), and friction welding the rail portion onto the main body portion (step 306). In some embodiments, creating the rail portion or the main body includes forging (step 308). The method may further comprise hardening the main body portion to RCW C33-37 (step 310) and hardening the rail portion to RCW C50-55 (step 312). The main body may be through hardened via traditional techniques while the rail portion may be induction hardened. Other processes may be used. In some embodiments, either hardening step 310, 312 may occur before the welding step 306. In some embodiments, creating the main body portion may include machining an existing track link to make the main body portion of the track link (step 314).

By using linear friction welding, it is contemplated that the creation of transition zones such as a heat affected zone, which may create brittleness, may be avoided or limited, leading to a bi-metal track link that is more durable than has heretofore been devised.

Process variables that may be adjusted to achieve a desired linear friction weld are expressed by the equation below:

$$w = \frac{\alpha f P}{2\pi A}$$

where α is the amplitude, f is the frequency, P is the pressure and A the weld area. From this equation it can be seen that the specific power input (w) can be increased by increasing the frequency, amplitude or pressure. The specific power input must be exceeded and varies for the materials being used in order to provide a suitable weld. The amount of upset time may also be important in forming a suitable weld. This is best determined experimentally.

For weld areas less than 3000 mm², it is contemplated that frequency could range from 10-70 Hz, that up to 20 tonnes of axial load may be applied, and that an amplitude of 5 mm could be employed. In some cases, these process variables may be varied depending on the application and may even be varied during the process of making a joint to optimize the quality of the joint.

While the phrase, friction welding has been used herein, it is to be understood that this is technically a misnomer because no melt occurs, friction welding is not actually a welding process in the traditional sense, but a forging or solid state adhesion technique. Accordingly, anywhere herein where the term "friction welding" has been used, it is to be understood that it is better described as "friction adhesion" and should be so interpreted.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track link for use with a track chain of a vehicle that includes a plurality of track pins and bushings, the track link comprising:
   a main body portion that defines a plurality of apertures for receiving a track pin or bushing, the main body portion comprising a low alloy steel and the plurality of apertures extending along a first direction through the main body portion; and
   a solid rail portion that that comprises a high alloy steel, forming a flat interface lacking a bonding agent with the main body portion making direct contact with the main body portion;
   wherein the track link defines a minimum distance from the rail portion to any of the plurality of apertures measured along a second direction that is perpendicular to the first direction, and a consistent rail thickness that is measured along the second direction and that consistently is greater than zero, and a ratio of the rail thickness to the minimum distance ranges from 1.0 to 2.5.

2. The track link of claim 1 wherein the rail portion lacks apertures and is attached to the main body portion using linear friction adhesion.

3. The track link of claim 1 wherein the hardness of the rail portion of the track link is RCW C50-55.

4. The track link of claim 1 wherein the hardness of the main body portion is RCW C33-37.

5. The track link of claim 1 wherein the minimum distance from the rail portion to any of the plurality of apertures of the main body portion is 4-8 mm.

6. The track link of claim 1 wherein the rail thickness ranges from 4 to 20 mm.

7. A track chain assembly for use with a vehicle that includes an endless track drive, the track chain comprising:
   a plurality of track pins and track bushings disposed about the track pins; and
   a plurality of track links that are connected to each other by at least one of the plurality of track pins and track bushings, wherein at least one track link comprises a main body portion that defines a plurality of apertures for receiving at least one of the plurality of track pins and track bushings, the main body portion comprising a low alloy steel and the plurality of apertures extending along a first direction through the main body portion, and a rail portion that that comprises a high alloy steel;
   wherein the track link defines a minimum distance from the rail portion to all of the plurality of apertures measured along a second direction that is perpendicular to the first direction, and an unvarying rail thickness that is measured along the second direction, and a ratio of the rail thickness to the minimum distance ranges from 1.0 to 2.5, and the rail portion forms a linear interface with the main body portion, the linear interface lacking a bonding agent.

8. The track chain of claim 7 wherein the rail portion lacks apertures and is attached to the main body portion using linear friction adhesion.

9. The track chain of claim 7 wherein the hardness of the rail portion of the track link is RCW C50-55.

10. The track chain of claim 7 wherein the hardness of the main body portion is RCW C33-37.

11. The track chain of claim 7 wherein the rail portion defines a consistent rail thickness.

12. The track chain of claim 11 wherein the minimum distance from the rail portion to any aperture of the main body portion is 4-8 mm.

13. The track chain of claim 7 wherein the rail thickness ranges from 4 to 20 mm.

14. The track chain of claim 7 wherein all of the track links are similarly constructed.

15. A method of fabricating a track link comprising:
    creating a rail portion of a track link from a high alloy steel;
    creating a main body portion of a track link from a low alloy steel; and
    friction adhering the rail portion onto the main body portion using the following process variables: an amplitude of 5 mm, and a frequency of 10-70 HZ
    while maintaining a ratio of a consistent thickness of the rail portion to a length, with said length defined by a minimum distance from the rail portion to an aperture configured to receive a track pin or bushing, of 1.0 to 2.5.

16. The method of claim 15 wherein creating the rail portion or the main body includes forging.

17. The method of claim 15 further comprising hardening the main body portion to RCW C33-37.

18. The method of claim 15 further comprising hardening the rail portion to RCW C50-55.

19. The method of claim 18 wherein the hardening step occurs before the adhering step.

* * * * *